(12) United States Patent
Hayata

(10) Patent No.: US 6,299,098 B1
(45) Date of Patent: Oct. 9, 2001

(54) METHOD AND APPARATUS FOR MANUFACTURING MAGNETIC RECORDING MEDIUM

(75) Inventor: Youichi Hayata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/455,313

(22) Filed: Dec. 6, 1999

(30) Foreign Application Priority Data

Dec. 7, 1998 (JP) .................................................. 10-347191

(51) Int. Cl.⁷ ..................................................... B65H 35/02
(52) U.S. Cl. ..................... 242/525; 242/525.3; 242/525.6
(58) Field of Search ................................. 242/525, 525.1, 242/525.3, 525.6

(56) References Cited

U.S. PATENT DOCUMENTS

| | | | |
|---|---|---|---|
| 2,286,675 | * | 6/1942 | Gibbons ............................ 242/525.3 |
| 2,593,154 | * | 4/1952 | Judelson ............................ 242/525.1 |
| 3,096,039 | * | 7/1963 | Doven ............................... 242/525.1 |
| 3,196,723 | * | 7/1965 | Cohn et al. ........................... 242/525 |
| 3,226,049 | * | 12/1965 | Corbett .............................. 242/525.3 |
| 3,536,273 | * | 10/1970 | Hawkins ............................ 242/525.3 |
| 4,572,452 | * | 2/1986 | Driscoll et al. ....................... 242/525 |
| 4,621,777 | * | 11/1986 | O'Connor ............................ 242/525 |
| 5,804,011 | | 9/1998 | Dutta et al. ........................... 156/160 |
| 5,904,312 | * | 5/1999 | Hinz et al. ............................ 242/525 |
| 5,914,084 | | 6/1999 | Benson et al. ........................ 264/284 |
| 5,916,663 | | 6/1999 | Chappell et al. ...................... 428/152 |

* cited by examiner

Primary Examiner—Emmanuel M. Marcelo
(74) Attorney, Agent, or Firm—Sughrue, Mion, Zinn, Macpeak & Seas, PLLC

(57) ABSTRACT

A method for manufacturing a magnetic recording medium with which a blank web fed from a feeding roller is conveyed by rollers to a cutting blade in the longitudinal direction of the web when magnetic recording mediums are manufactured, the method comprising the steps of primary cutting the blank web in the longitudinal direction into a plurality of sections; and secondary cutting the thus primary cut blank web into plurality of webs each having a given width substantially immediately after the cutting.

8 Claims, 4 Drawing Sheets

METHOD AND APPARATUS FOR MANUFACTURING MAGNETIC RECORDING MEDIUM

BACKGROUND OF THE INVENTION

The present invention relates to a method and an apparatus for manufacturing a magnetic recording medium, and more particularly to a method and an apparatus for manufacturing a magnetic recording medium capable of stabilizing accuracy of the width of a magnetic recording medium cut to have a given width.

Hitherto, magnetic recording mediums, such as audio tapes, video tapes and computer tapes, have been manufactured such that a wide width blank web comprising a non-magnetic support member on which a magnetic layer containing ferromagnetic particles is formed, is conveyed by rollers. Then, the web is subjected to an orienting process, a drying and solidifying process and surface treatment. Finally, the web is cut into the longitudinal direction of the web.

After the magnetic layer of the wide web is subjected to surface treatment, the web is temporarily wound up. Then, the wound web is set to a cutting apparatus. FIG. 3 shows a state in which the web has been set to the cutting apparatus. In the cutting apparatus 20, the blank web 50 is fed from a feeding roller 100 to be conveyed on a conveying roller 21, and then guided to a cutting blade 40 through a reference roller 22 and conveying rollers 23, 24 and 25.

The web 50 guided to the cutting blade 40 is cut into the longitudinal direction by upper and lower blades 41 and 42 which constitute the cutting blade 40. Thus, a plurality of magnetic recording mediums 51 each having a small width are formed. The magnetic recording mediums 51 are conveyed on the conveying rollers 27 and 28 to be wound around individual winding rollers 29.

A wide web having a width of, for example, about 1000 mm has a thick coating in the central portion thereof so as to reliably be wound up by utilizing its tension. If the web having the above-mentioned coating is kept maintained in a state that it has been wound around the feeding roller for a predetermined period of time, the web is apt to be slack easily due to the fact that the central portion X is stretched excessively as shown in FIG. 4. Such web kept maintained under the above-mentioned state for the time is sequentially fed from the feeding roller, subjected to the foregoing processes, and then moved to the cutting portion 40 to be cut into predetermined number of parts (for example, six parts in FIG. 4) At that time, a portion of the web where must be cut is undesirably moved vertically and laterally by the existence of the slack at the central portion X thereof. Accordingly, it is difficult to obtain a plurality of cut webs (that is, six parts) which have the same widths Y one another. Namely, the plurality of cut webs each having stable width cannot be realized by the cutting.

Note that a thick web having a large thickness does not arise a critical problem because the thick web is free from considerable slack of the central portion, whereas a thin web, such as a thin metal web, having a small thickness suffers from the problem of the slack of the central portion.

SUMMARY OF THE INVENTION

Accordingly, an object of the present invention is to provide a method and an apparatus for manufacturing a magnetic recording medium which are capable of stabilizing the accuracy of the width of the magnetic recording medium cut to have a given width even when the web has a small thickness in the central portion.

The above-mentioned object can be achieved by a method for manufacturing a magnetic recording medium, the method according to the present invention comprising the step of:

conveying a blank web fed from a feeding roller by rollers, primary cutting the blank web in a longitudinal direction of the blank web into a plurality of sections;

secondary cutting the thus primary cut blank web into a plurality of webs each having a given width substantially immediately after the primary cutting; and winding the webs around winding rollers respectively.

In the above-mentioned method, it is preferable that the primary cutting steps comprises the step of: cutting a center portion of the blank web in a lateral direction perpendicular to the longitudinal direction.

In the above-mentioned method, it is also preferable that one of the primary and secondary cutting steps comprises the step of:

cutting both edge portions of the blank web in a lateral direction perpendicular to the longitudinal direction.

Moreover, the above-mentioned object can be attained by an apparatus for manufacturing a magnetic recording medium, the apparatus comprising:

a plurality of rollers for conveying a blank web fed from a feeding roller, a primary cutting mechanism for primary cutting the blank web in a longitudinal direction of the blank web into a plurality of sections;

a secondary cutting mechanism, disposed immediately downstream of the primary cutting mechanism in a web conveying direction, for secondary cutting the thus primary cut blank web into a plurality of webs each having a given width; and winding rollers on which the webs are respectively wound, the winding rollers being disposed downstream of the secondary cutting mechanism in the web conveying direction.

In the above-mentioned construction, it is advantageous that the primary cutting mechanism comprises:

a cutting blade for cutting a center portion of the blank web in a lateral direction perpendicular to the longitudinal direction.

In the above-mentioned construction, it is advantageous that one of the primary and secondary cutting mechanisms comprises:

cutting blades for cutting both edge portions of the blank web in a lateral direction perpendicular to the longitudinal direction.

According to the present invention, immediately after the blank web fed from the feeding roller is primary cut into a plurality of sections, the thus primary cut web is secondary cut into the longitudinal direction to have a given width, when the magnetic recording medium is manufactured. In other words, the blank web is previously cut and sectioned into a plurality of webs immediately before the webs are guided and reached to the secondary cutting mechanism.

Accordingly, even when a web of a type having a central portion coated with a thick coating and being slack is conveyed, the slack portion of the web is easily eliminated by stretching the web in both widthwise and longitudinal directions by the process for primary cutting the web into a plurality of sections. Therefore, occurrence of slack on the web can be prevented.

With the method and the apparatus of the present invention, accuracy of the width of the magnetic recording medium can be stabilized, because the webs are finally cut in the secondary cutting mechanism while the web is held by being subjected to tension.

As described above, it is possible to cut the blank web into the plural sections by placing a primary cutting mechanism into a space between the feeding roller and a cutting blade of the secondary cutting mechanism, in which the primary cutting mechanism has a cutting blade which cuts the blank web in the longitudinal direction of the web.

Accordingly, according to the present invention above, accuracy of a width of a magnetic recording medium can be stabilized, because a blank web is primary cut into a plurality of sections immediately before a process of the secondary cut.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
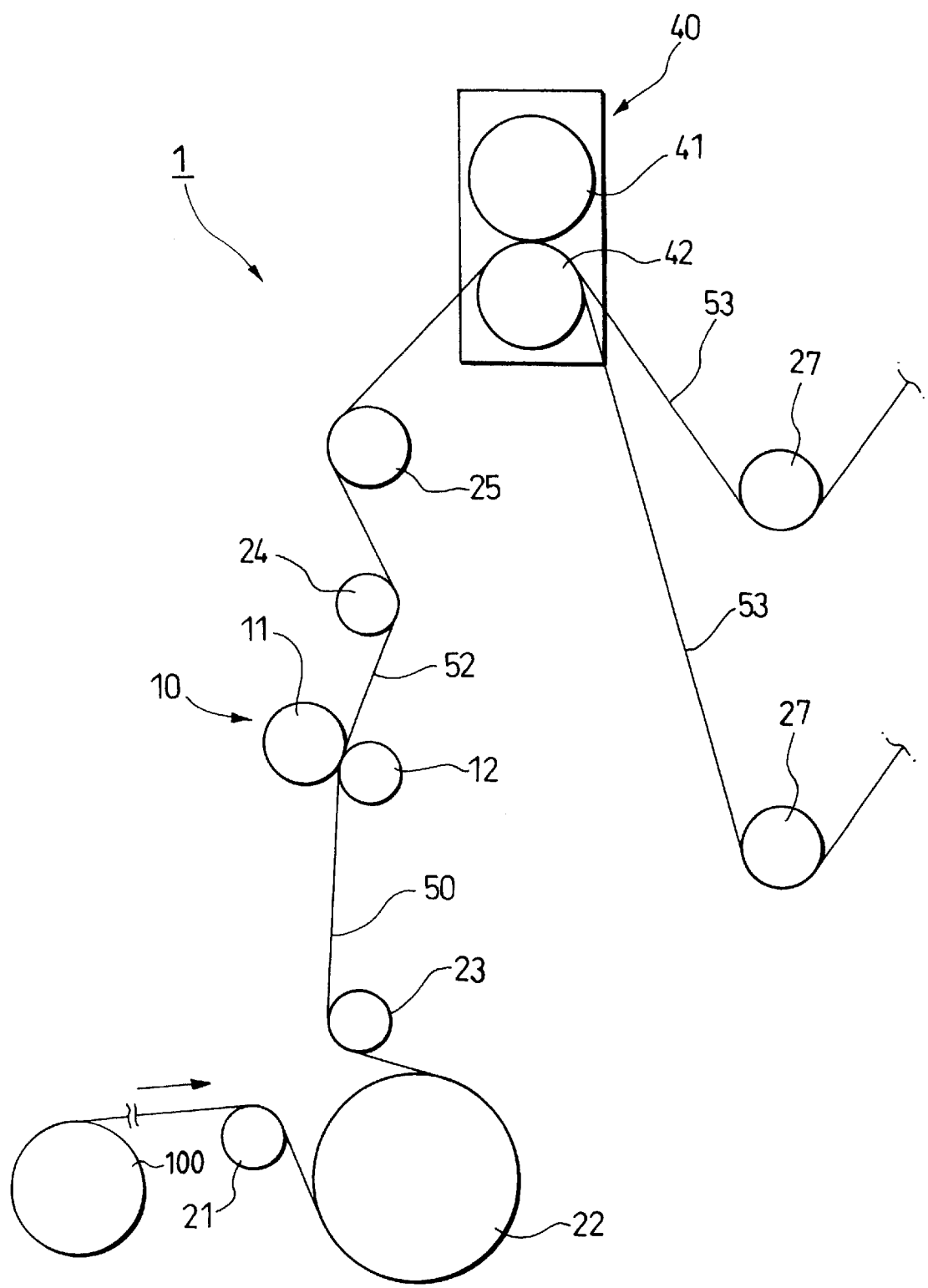
FIG. 1 is a view showing an embodiment of an overall structure of a cutting apparatus which is applicable to an apparatus for manufacturing a magnetic recording medium according to the present invention.

Referring to the accompanying drawings, an embodiment of the present invention will now be described. FIG. 1 is a view showing an embodiment of a cutting apparatus 1 which is an apparatus for manufacturing a magnetic recording medium according to the present invention.

A composition of the magnetic recording medium according to the present invention will now be described.

| Preparation of Coating Solution for Forming Non-Magnetic Layer and Coating Solution for Forming Magnetic Layer | |
|---|---|
| (1) Composition of Dispersant Containing Abrasive Material | 100 parts by weight |
| α-Al$_2$O$_2$ (alumina) | |
| [(average particle size: 0.2 μm)] | |
| vinyl chloride copolymer containing a polar group (—SO$_3$Na group) | 12 parts by weight |
| [content of —SO$_3$Na group: 5 × 10$^{-5}$ mol/g, degree of polymerization: 350, content of epoxy group: 3.5 wt % in monomer units, (MR-110 manufactured by Nihon Zeon)] | |
| methylethylketone | 100 parts by weight |

The foregoing components were dispersed by using a sand mill so that dispersant containing abrasive material was prepared.

| | |
|---|---|
| (2) Component of Forming Non-Magnetic Layer non-magnetic powder: titanium dioxide TiO$_2$ (rutile type) | 100 parts by weight |
| [content of TiO$_2$: 90% or higher average primary particle size: 0.035 μm specific surface area measured by BET method: 40 m$^2$/g pH: 7.0 DBP oil absorption: 27 g/100 g to 38 g/100 g Mohs hardness: 6.0 surface treatment material (Al$_2$O$_2$)] | |
| surface treatment material for magnetic member [phenylphosphonic acid] | 0.3 part by weight |
| vinyl chloride copolymer containing a polar group (—SO$_3$Na group) | 12 parts by weight |
| [content of —SO$_3$Na group: 5 × 10$^{-6}$ mol/g, degree of polymerization: 350, content of epoxy group: 3.5 wt % in monomer units, (MR-110 manufactured by Nihon Zeon)] | |
| polyester polyurethane resin containing a polar group (—SO$_3$Na group) | 5 parts by weight |
| [neopentylglycol/caprolactone polyol/MDI = 0.9/2.6/1 (weight ratio), —SO$_3$Na group contained: 1 × 10$^{-4}$ mol/g | |
| polyisocyanate [CORONATE L manufactured by Nihon Polyurethane] | 3 parts by weight |
| dispersant containing above-mentioned abrasive material (α-alumina) | 10 parts by weight |
| carbon black [average particle size: 0.10 μm, manufactured by Asahi Carbon] | 10 parts by weight |
| butylstearate | 0.1 part by weight |
| stearic acid | 0.2 part by weight |
| oleic acid | 0.1 part by weight |
| methylethylketone | 150 parts by weight |
| cyclohexane | 150 parts by weight |
| (3) Component for Forming Magnetic Layer ferromagnetic metal powder | 100 parts by weight |
| [(composition/Fe:Co:Y:Al = 100:10:3:11 coercive force (Hc): 180 oersted (Oe) specific surface area measured by BET method: 57 m$^2$/g size of crystallite: 170 Å saturated quantity of saturation (σs): 130 emu/g particle size (average length of major axes): 0.10 μm, pH: 9.3] | |
| surface treatment material for magnetic member [phenyl sulfonic acid)] | 3 parts by weight |
| vinyl chloride copolymer containing a polar group —SO$_3$Na group) | 10 parts by weight |
| [content of —SO$_3$Na group: 5 × 10$^{-6}$ mol/g, degree of polymerization: 350, content of epoxy group: 3.5 wt % in monomer units, (MR-110 manufactured by Nihon Zeon)] | |
| polyester polyurethane resin containing a polar group (—SO$_3$Na group) | 2.5 parts by weight |
| [neopentylglycol/caprolactone polyol/MDI = 0.9/2.6/1 (weight ratio), —SO$_3$Na group contained: 1 × 10$^{-4}$ mol/g] | |
| polyisocyanate [CORONATE L manufactured by Nihon Polyurethane] | 2.5 parts by weight |
| dispersant containing above-mentioned abrasive material (α-alumina) | 10 parts by weight |
| carbon black [#50, average particle size: 0.1 μm, manufactured by Asahi Carbon] | 1 parts by weight |
| butylstearate | 1 part by weight |
| stearic acid | 2 parts by weight |
| oleic acid | 1 part by weight |
| methylethylketone | 150 parts by weight |
| cyclohexane | 50 parts by weight |

Among the foregoing components for forming the magnetic layer and those for forming the non-magnetic layer, components except for the dispersant containing the abrasive material were continuously kneaded in a kneader (an open kneader) so that coating solution for forming the non-magnetic layer and that for forming the magnetic layer were prepared.

| Preparation of Coating Solution for Forming Backcoat Layer | |
| --- | --- |
| (Components for Forming Backcoat Layer) fine-grain carbon black powder [BP-800 manufactured by Cabot, average particle size: 17 μm)] | 100 parts by weight |
| fine-grain carbon black powder [(manufactured by Carbon Calp, thermal black, average particle size: 270 μm)] | 10 parts by weight |
| calcium carbonate (inorganic soft powder) [manufactured by Shiraishi Kogyo Kaisha Ltd., HAKUENKA-O, average particle size: 40 μm, Mohs hardness: 3)] | 80 parts by weight |
| α-alumina (inorganic hard powder) [average particle size: 200 μm, Mohs hardness: 9] | |
| nitrocellulose resin | 140 parts by weight |
| polyurethane resin | 15 parts by weight |
| polyisocyanate | 40 parts by weight |
| polyester resin | 5 parts by weight |
| dispersant: | |
| copper oleate | 5 parts by weight |
| copper phthalocyanine | 5 parts by weight |
| barium sulfate | 5 parts by weight |
| methylethyl ketone | 2200 parts by weight |
| butyl acetate | 300 parts by weight |
| toluene | 600 parts by weight |

After each compound which formed the backcoat layer was continuously kneaded by a kneader, the coating solution for forming the backcoat layer was prepared.

Manufacture of Magnetic Tape

The obtained coating solutions for forming the non-magnetic layer and for forming the magnetic layer were simultaneously applied to be laminated on the surface of an elongated polyethylene terephthalate (PET) support member (having a thickness of 6.0 μm) so that the thickness of the non-magnetic layer after it was dried was 2.2 μm and the thickness of the magnetic layer after it has dried was 0.3 μm. In a state that the two coating solutions were wet and swelled state, an orienting process was performed by using a cobalt magnet having a magnetic flux density of 3000 gauss and a solenoid having a magnetic flux density of 1500 gauss. Then, a drying process was performed to form so that the non-magnetic layer and the magnetic layer.

Next, the coating solution for forming the backcoat layer was applied to another side (opposite to the magnetic layer) of the support member so that the thickness of the coating solution was 0.5 μm after it was dried. Then, the solution was dried to form the backcoat layer. Thus, a magnetic recording laminated roll was obtained which had the non-magnetic layer and the magnetic layer formed on one surface of the support member and the backcoat layer on the other surface.

The obtained magnetic recording laminated roll was allowed to pass through a calender processing machine (temperature: 80°C., linear pressure: 300 kg/cm$^2$) so that a calender process was performed. The calender processing machine has a 7-stage structure and comprises only metal rolls.

Referring to FIG. 1, the structure of a cutting apparatus according to the present invention will now be described. As shown in FIG. 1, in the cutting apparatus 1, a web 50, as a blank web, is conveyed from a feeding roller 100 to be conveyed on a conveying roller 21, a reference roller 22, a conveying roller 23, a cutting blade 10, as a primary cutting mechanism, and conveying rollers 24 and 25. Then, the web 50 is guided to a cutting blade 40, as a second cutting mechanism, to be cut into the longitudinal direction of the web 50 by an upper blade 41 and a lower blade 42 which constitute the cutting blade 40, similarly to a conventional example. Thus, a plurality of magnetic recording mediums 53 each having a small width are formed to be conveyed on a conveying roller 27 and so forth, and then the magnetic recording mediums 53 are wound around individual winding rollers (not shown).

That is, the characterized structure of the present invention is that the cutting blade 10 different from the cutting blade 40 which finally cuts the web 52 to have a given width, is displaced between the conveying roller 23 and the conveying roller 24. The cutting blade 10 comprises an upper blade 11 having one blade and a lower blade 12 having one groove corresponding to the blade of the upper blade 11.

When the web 50 which must be conveyed, is a wide web having a width of, for example, about 1000 mm, the web 50 has a central portion coated with a thick coating to reliably be wound up by using tension. If the web having the above-mentioned coating is maintained in a state that the web is wound around the roller for a predetermined period, the central portion apt to be slack easily. According to the present invention, however, the web 50 fed from the feeding roller is cut into two sections by the cutting blade 10. Then, the cutting blade 40 finally cuts the two webs 52 to realize a predetermined size. Thus, the magnetic recording medium 53 is manufactured with a stable accuracy of a width.

Figure 2:
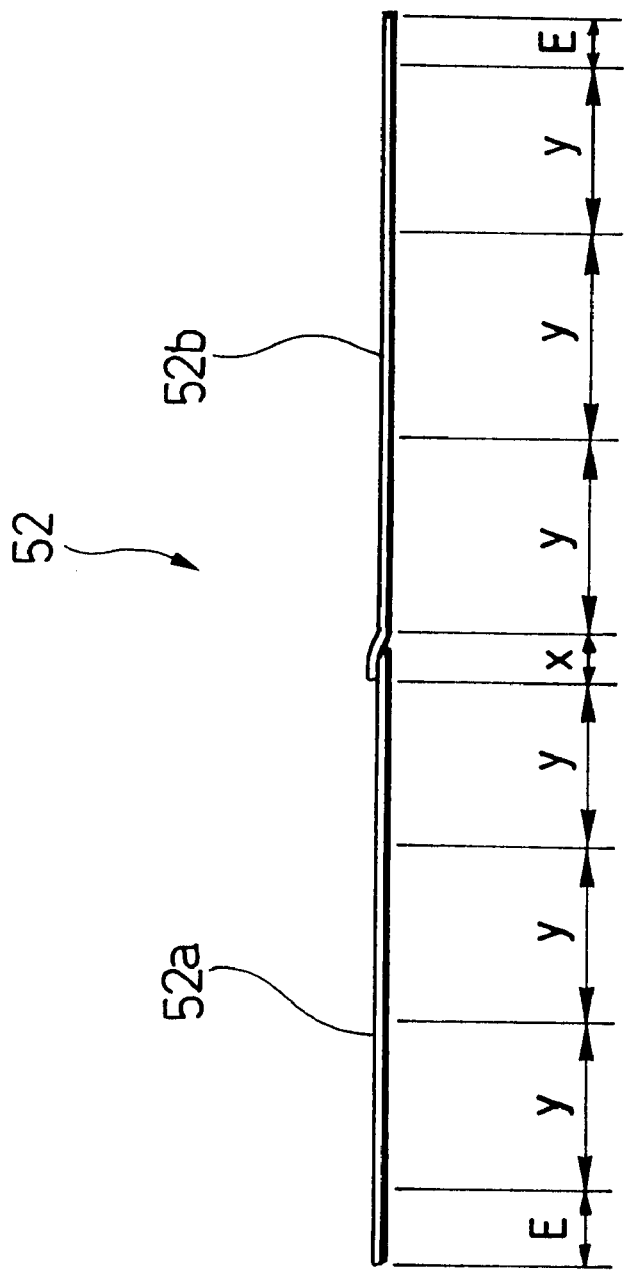
FIG. 2 is a view of a state of a web after a blank web has been cut into a plurality of sections by the cutting blade.
Figure 4:
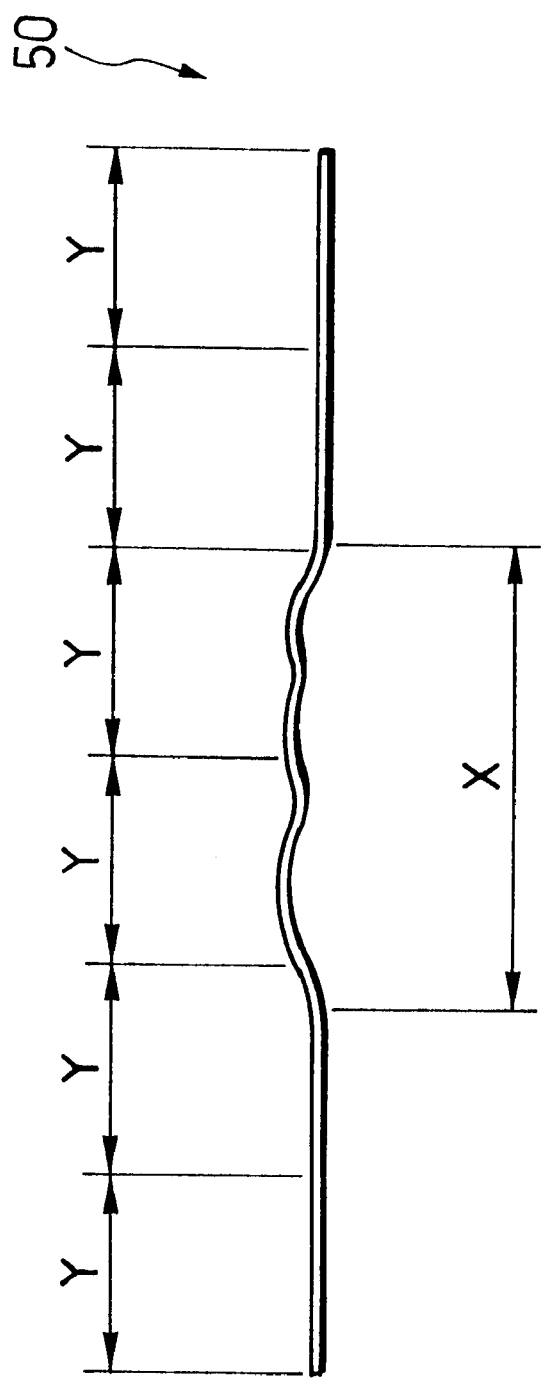
FIG. 4 is a view of a state of a blank web before it is cut by a cutting blade.

When the web 50 having the central portion X coated thickly and having the central portion X being slack as shown in FIG. 4, is conveyed, the cutting blade 10 cuts the web 50 at the center thereof into a left web 52a and a right web 52b as shown in FIG. 2. Thus, the left web 52a is moved to overlap the right web 52b or the right web 52b is moved to overlap the left web 52b so as to form a portion x. Accordingly, both of the left web 52a and the right web 52b can easily be stretched in the widthwise direction and the longitudinal direction. As a result, slack of the web 52 can be prevented.

In other words, the web 52 can be held by being subjected to sufficient tension. Accordingly, the web 52 can finally be cut by the cutting blade 40 without vertical movement of the web 52, so that accuracy of the width y of the magnetic recording medium 53 is stabilized.

Note that it is also considerable that the blank web is previously cut by another apparatus which is different from the above-mentioned embodiment, before the blank web is cut into webs each having a final/complete dimension as a product. For example, two processes can be considered and will be hereinafter explained.

Figure 3:
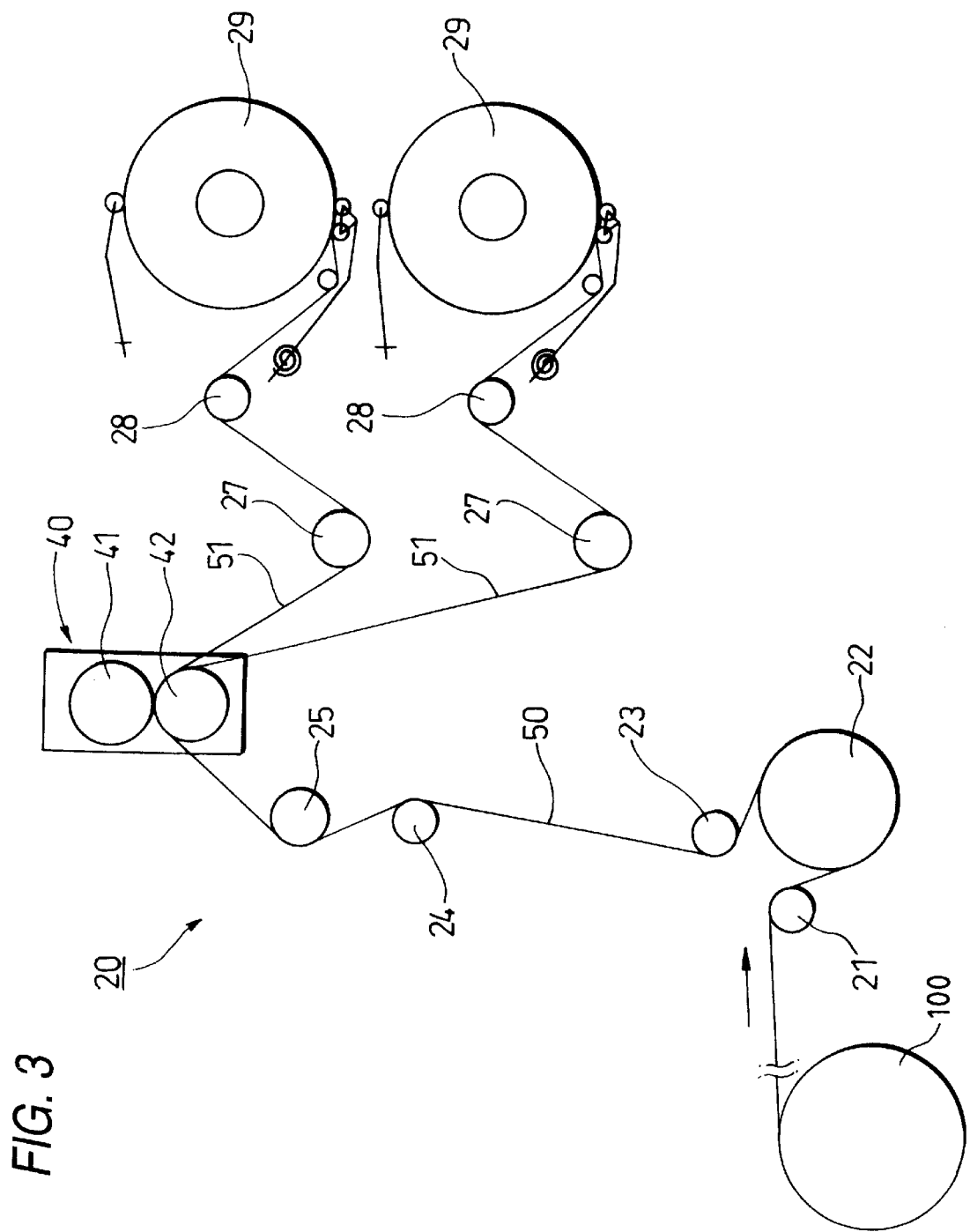
FIG. 3 is a view showing of a conventional cutting apparatus for manufacturing a magnetic recording medium.

(1) A blank web having considerably wide width is cut into a half size thereof, and then wound on the feeding roll. After the wound web of the half sized width is kept maintained for the period of time, the wound web wound around the feeding roller is set to the cutting apparatus. When the half-sized blank web is conveyed by the rollers as shown in FIG. 3, the half-sized blank web is cut, into webs each having a final width as a product, with cutting blade which are disposed at an predetermined interval corresponding to the final width of each webs.

(2) In a case where tapes, such as audio tapes, each having a small width are obtained from a blank web having an excessively large width, a considerably large number of tapes as a final product are obtainable therefrom. Accordingly, a cutting apparatus having an extremely large size is required to cut the same at one time. In this case, a blank web of wide width is previously cut into for example a half size thereof, then wound on the feeding roll. After the wound web of the half sized width is kept maintained for the period of time, the wound web wound around the feeding roller is set to the cutting apparatus.

The foregoing cutting processes (1) and (2) are, however, cutting which is performed before the web is set to the feeding roller. Therefore, the above-mentioned present invention is considerably different from the foregoing techniques in that cutting is performed after the web has been set to the feeding roller. That is, with the present invention, the web can be continuously cut without subjecting to a process for temporarily removing the cut blank web.

The present invention is not limited to the foregoing embodiment. Therefore, arbitrary changes and modifications are permitted. For example, the position of the cutting blade 10 is not limited to the position between the conveying roller 23 and the conveying roller 24. If the cutting blade 10 is placed in front of the cutting blade 40, the cutting blade 10 may be placed, for example, in the rear of the conveying roller 24. The number of the blade of the cutting blade 10, which is the characteristic structure of the present invention, is not limited to one. A plurality of blades, for example, two or three blades may be provided for the cutting blade 10. Note that the number of the blades of the cutting blade 10 must be determined to be adaptable to the purpose of the magnetic recording medium. That is, the upper limit of the number of blades must be determined to be capable of cutting the web to have a width which is larger than the width of the magnetic recording medium required to finally be obtained. As the number of blades for cutting the web is enlarged under the foregoing condition, a magnetic recording medium having satisfactory accuracy of the width of the web can be obtained. If the number of blades is enlarged excessively, however, the manufacturing cost of the cutting blade cannot be reduced. Moreover, the number of magnetic recording mediums which can finally be obtained is undesirably reduced. Therefore, the number of the blades must carefully be determined.

Further, as shown in FIG. 2 it is preferable to cut both edge portions E which are non-coated in a usual case, of the blank web in the longitudinal direction, because cutting of the foregoing portions enables satisfactory tension to be realized. The reason for this lies in that the non-coated portions are heat-shrunk in the longitudinal direction owing to drying and the heat treatment, as compared with the coated portion. Thus, tension will easily be subjected to the foregoing portions. If the foregoing portions are cut, uniform tension in the lateral direction can easily be obtained.

As described above, according to the present invention, the magnetic recording medium is manufactured by cutting the web fed from the feeding roller into a plurality of sections, and finally cutting the web in the longitudinal direction to have a predetermined size. Therefore, even when the web having a central portion coated thickly and thereby the central portion having a slack portion is conveyed, the slack portion of the web is cut into sections, thereby, tension is subjected to the web. Accordingly, the slack can be prevented.

The web held by being subjected to tension is finally cut by the cutting blade to have the predetermined size. Therefore, accuracy of the width of the magnetic recording medium can be stabilized.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method for manufacturing a magnetic recording medium, said method comprising the step of:

conveying a blank web fed from a feeding roller;

primary cutting said blank web in a longitudinal direction of the blank web into a plurality of sections;

secondary cutting the thus primary cut blank web into a plurality of webs each having a given width substantially immediately after said primary cutting; and winding said webs around winding rollers respectively.

2. The method according to claim 1, wherein said primary cutting step comprises the step of:

cutting a center portion of said blank web in said longitudinal direction.

3. The method according to claim 2, wherein one of said primary and said secondary cutting steps comprises the step of:

cutting both edge portions of said blank web in said longitudinal direction.

4. The method according to claim 1, wherein one of said primary and said secondary cutting steps comprises the step of:

cutting both edge portions of said blank web in said longitudinal direction.

5. A apparatus for manufacturing a magnetic recording medium, said apparatus comprising:

a plurality of rollers for conveying a blank web fed from a feeding roller;

a primary cutting mechanism for primary cutting said blank web in a longitudinal direction of the blank web into a plurality of sections;

a secondary cutting mechanism, disposed immediately downstream of said primary cutting mechanism in a web conveying direction, for secondary cutting the thus primary cut blank web into a plurality of webs each having a given width; and winding rollers on which said webs are respectively wound, said winding rollers being disposed downstream of the secondary cutting mechanism in the web conveying direction.

6. The apparatus according to claim 5, wherein said primary cutting mechanism comprises:

a cutting blade for cutting a center portion of said blank web in said longitudinal direction.

7. The apparatus according to claim 6, wherein one of said primary and said secondary cutting mechanisms comprises:

cutting blades for cutting both edge portions of said blank 5 web in said longitudinal direction.

8. The apparatus according to claim 5, wherein one of said primary and said secondary cutting mechanisms comprises:

cutting blades for cutting both edge portions of said blank web in said longitudinal direction.

* * * * *